(12) United States Patent
Joachimsthaler et al.

(10) Patent No.: US 9,766,097 B2
(45) Date of Patent: Sep. 19, 2017

(54) MONITORING UNIT AND METHOD FOR MONITORING POSITION SIGNALS OF INCREMENTAL POSITION-MEASURING DEVICES

(75) Inventors: Ingo Joachimsthaler, Traunstein (DE); Thomas Mueller, Seebruck (DE); Thomas Schuermann, Rosenheim (DE)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 817 days.

(21) Appl. No.: 13/306,198

(22) Filed: Nov. 29, 2011

(65) Prior Publication Data
US 2012/0136625 A1    May 31, 2012

(30) Foreign Application Priority Data

Nov. 29, 2010   (DE) .................. 10 2010 062 123
Sep. 20, 2011   (DE) .................. 10 2011 083 042

(51) Int. Cl.
*G01D 5/245*    (2006.01)

(52) U.S. Cl.
CPC .................. *G01D 5/2457* (2013.01)

(58) Field of Classification Search
CPC ...................................................... G01D 5/00
USPC ....... 702/108, 116, 122, 151, 158, 182, 189; 33/707
See application file for complete search history.

(56) References Cited

U.S. PATENT DOCUMENTS

| | | | | |
|---|---|---|---|---|
| 4,103,288 A | * | 7/1978 | Westman | H04L 12/423 370/424 |
| 4,123,750 A | * | 10/1978 | Leney et al. | 341/11 |
| 4,228,514 A | * | 10/1980 | Weiss | 702/34 |
| 6,097,318 A | | 8/2000 | Hagl et al. | |
| 6,232,595 B1 | | 5/2001 | Okamuro et al. | |
| 6,803,863 B1 | | 10/2004 | Yang | |
| 7,031,031 B1 | | 4/2006 | Strasser | |
| 7,244,929 B2 | | 7/2007 | Rodi | |
| 7,770,304 B2 | * | 8/2010 | Oberhauser | G01D 5/34792 33/1 PT |
| 7,847,704 B2 | | 12/2010 | Wagner et al. | |
| 8,581,857 B2 | | 11/2013 | Matsubara | |

FOREIGN PATENT DOCUMENTS

| | | |
|---|---|---|
| CN | 1 304 029 | 7/2001 |
| CN | 101644980 | 2/2010 |
| DE | 10 2004 045 849 | 3/2006 |

(Continued)

*Primary Examiner* — Alexander Satanovsky
*Assistant Examiner* — Felix Suarez
(74) *Attorney, Agent, or Firm* — Andrews Kurth Kenyon LLP (57) ABSTRACT

In a monitoring unit for monitoring position signals of incremental position-measuring devices, at least two position signals are applied on the input side that result from the scanning of an incremental graduation track by a scanning unit and that are out-of-phase with each other. The monitoring unit includes a signal logic unit with which at least two position-dependent status data words are able to be generated from different position signals, and an evaluation unit to which the status data words are supplied, in which invalid statuses are ascertainable by comparing the status data words, and an error signal is able to be generated in response to an ascertained invalid status.

18 Claims, 3 Drawing Sheets

(56) References Cited

FOREIGN PATENT DOCUMENTS

| EP | 0 872 714 | 10/1998 |
|---|---|---|
| JP | 2005-017000 | 1/2005 |
| JP | 2009-020112 | 1/2009 |

* cited by examiner

MONITORING UNIT AND METHOD FOR MONITORING POSITION SIGNALS OF INCREMENTAL POSITION-MEASURING DEVICES

CROSS-REFERENCE TO RELATED APPLICATIONS

The present application claims priority to Application No. 10 2010 062 123.4, filed in the Federal Republic of Germany on Nov. 29, 2010, and to Application No. 10 2011 083 042.1, filed in the Federal Republic of Germany on Sep. 20, 2011, each of which is expressly incorporated herein in its entirety by reference thereto.

FIELD OF THE INVENTION

The present invention relates to a monitoring unit, as well as a method for monitoring position signals of incremental position-measuring devices. Such a monitoring unit and a method of this kind make it possible to already recognize errors of position signals in the position-measuring device.

Incremental position-measuring devices are widely prevalent, particularly in machine tools and in automation technology. They are used to determine the position of two objects movable relative to each other. In this context, a distinction is made in principle between linear encoders and angle encoders. For example, linear encoders are used to determine the position of two machine parts of a machine tool movable relative to each other. To that end, a measuring standard, e.g., in the form of a scale having an incremental graduation track, is joined to the one, and a scanning unit is joined to the other of the two objects, so that by scanning the incremental graduation track, position-dependent scanning signals are obtained, with whose aid, it is possible to determine the extent of the movement of the two objects relative to each other along the incremental graduation track.

Angle encoders, also referred to as rotary encoders, are constructed according to the same principle. However, in place of the scale, a circular disk is used as measuring standard, on whose circumference the incremental graduation track is applied. The disk is joined in rotatably fixed fashion to a shaft to be measured, while the scanning unit is fixedly mounted for this purpose.

The generation of the position signals may be based on various physical scanning principles, e.g., optical, magnetic, inductive or capacitive.

In response to the scanning of a periodic incremental graduation track with the aid of the scanning unit, at least two periodic, analog position signals, out-of-phase with each other, are obtained on the output side, which are evaluated to determine the relative position of the incremental graduation track and the scanning unit. The incremental graduation track and the scanning unit are preferably implemented such that, given a constant traversing speed, the position signals are substantially sinusoidal. Evaluation is accomplished first of all, by counting the graduation periods of the incremental graduation track, and secondly, by a further subdivision of the periodic position signals within one graduation period.

It is especially problematic that the evaluation of the position signals may fail if properties of one or more position signals change, e.g., due to aging effects. In particular, this may happen if the signal amplitude of a position signal becomes smaller or an offset occurs. Often, it is difficult or even impossible for the evaluation unit to determine whether the position-measuring device is defective, or whether in fact there is no relative movement between the scanning unit and the incremental graduation track.

SUMMARY

Example embodiments of the present invention provide a system by which errors of position signals are recognized in incremental position-measuring devices.

An example embodiment of a monitoring unit for monitoring position signals of incremental position-measuring devices, at least two position signals being applied on an input side that result from scanning of an incremental graduation track by a scanning unit and that are out-of-phase with each other, includes: a signal logic unit adapted to generate at least two position-dependent status data words from different position signals; and an evaluation unit adapted to ascertain invalid statuses by comparing the status data words and to generate an error signal in response to an ascertained invalid status.

The signal logic unit may include at least two status counting units adapted to count status changes of the position signals and adapted to supply counter values as status data words to the evaluation unit.

The position signals may include a 0°-position signal, a 90°-position signal, a 180°-position signal, and a 270°-position signal having a phase shift of 90° relative to each other. Each status counting unit may be suppliable with three position signals and may include two comparators adapted to generate quadrant count values, out-of-phase with each other by 90°, from two of the three position signals that are out-of-phase with each other by 90°.

The signal logic unit may be adapted to supply the quadrant count values as status data words to the evaluation unit.

Each status counting unit may include a counter to which the quadrant count values are suppliable and which is adapted to count signal periods of the position signals, and the signal logic unit may be adapted to supply the counter values of the counters as status data words to the evaluation unit.

The position-measuring device may be adapted to supply output signals to the monitoring unit, and the evaluation unit may be adapted to take into account the output signals of the position-measuring device in the comparison.

The signal logic unit may be adapted to generate four status data words, and the evaluation unit may include a first evaluation unit and a second evaluation unit, the first evaluation unit arranged in the position-measuring device and the second evaluation unit arranged in sequential electronics, two of the four status words suppliable to the first evaluation unit and to the second evaluation unit, respectively, the first evaluation unit adapted to generate a first error signal in response to an ascertained invalid status, and the second evaluation unit adapted to generate a second error signal in response to an ascertained invalid status.

The position-measuring device may include an interface unit and the sequential electronics may include an interface unit, the interface units adapted to supply to the second evaluation unit the two status data words, which are compared in the second evaluation unit.

The status data words suppliable to the second evaluation unit may include counter values whose counting range encompasses a measuring range of the position-measuring device.

Example embodiments of the present invention provide a method by which errors of position signals are recognized in incremental position-measuring devices.

An example embodiment of a method for monitoring position signals of incremental position-measuring devices with the aid of a monitoring unit, which is supplied on an input side with at least two position signals that result from a scanning of an incremental graduation track by a scanning unit and that are out-of-phase with each other, includes: generating at least two position-dependent status data words from different position signals in a signal logic unit; ascertaining invalid statuses of the status data words by comparison in an evaluation unit; and generating an error signal in response to an ascertained invalid status in the evaluation unit.

The signal logic unit may include at least two status counting units, which count status changes of the position signals and which output counter values as status data words to the evaluation unit.

The position signals may include a 0°-position signal, a 90°-position signal, a 180°-position signal, and a 270°-position signal which have a phase shift of 90° relative to each other, three position signals being supplied to each status counting unit, each status counting unit including two comparators, which generate, from two of the three position signals that are out-of-phase with each other by 90°, quadrant count values out-of-phase with each other by 90°.

The comparators may supply the quadrant count values as status data words to the evaluation unit.

Each status counting unit may include a counter to which the quadrant count values are supplied and which counts signal periods of the position signals, and may supply the counter values of the counters as status data words to the evaluation unit.

Output signals of the position-measuring device may be supplied to the monitoring unit, and the evaluation unit may take into account the output signals in the comparison.

Four status data words may be generated in the signal logic unit, the evaluation unit may include a first evaluation unit and a second evaluation unit, the first evaluation unit arranged in the position-measuring device and the second evaluation unit arranged in sequential electronics, two of the four status data words are supplied to the first evaluation unit and to the second evaluation unit, respectively, and a first error signal is generated in the first evaluation unit in response to an ascertained invalid status, and a second error signal is generated in the second evaluation unit in response to an ascertained invalid status.

The two status data words, which are compared in the second evaluation unit, may be supplied to the second evaluation unit via an interface unit of the position-measuring device and an interface unit of the sequential electronics.

The status data words, which are supplied to the second evaluation unit, may include counter values whose counting range encompasses a measuring range of the position-measuring device.

Further features and aspects of example embodiments of the present invention are described in more detail below with reference to the appended Figures.

DETAILED DESCRIPTION

Figure 1:
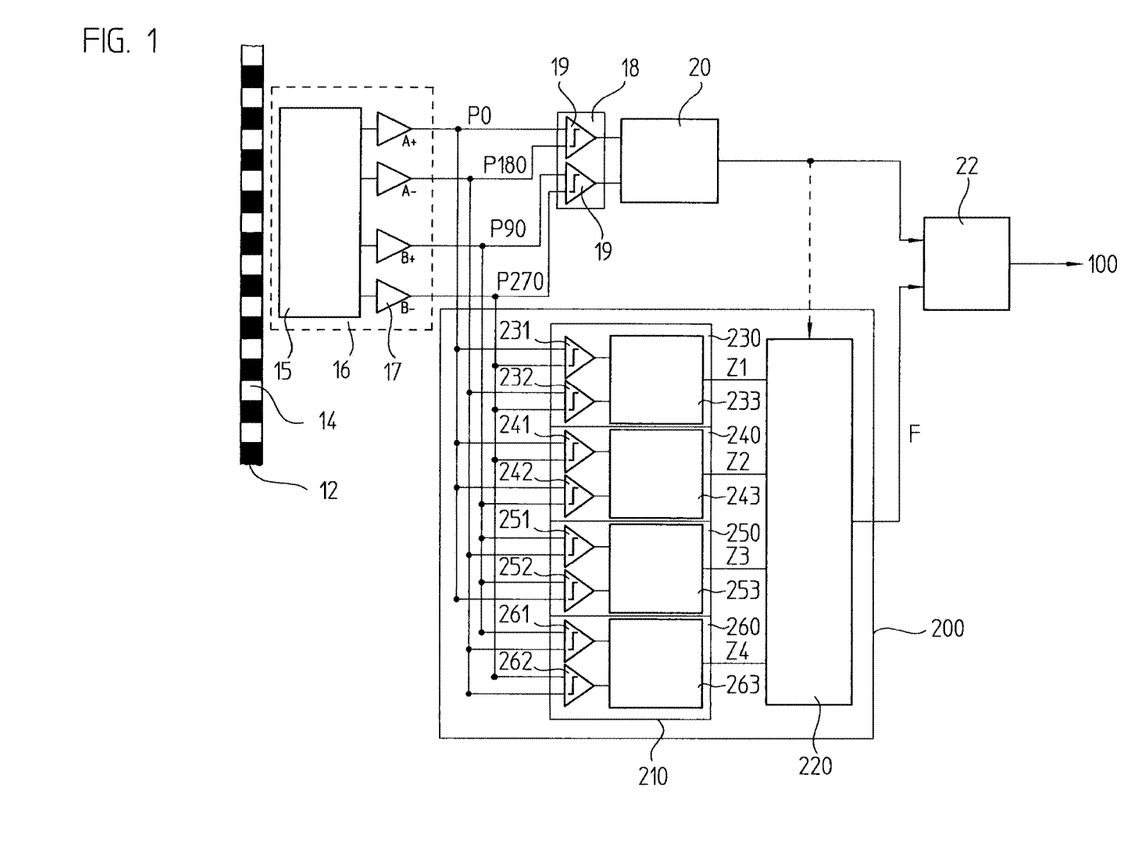
FIG. 1 illustrates a block diagram of a position-measuring device having a monitoring unit according to an example embodiment of the present invention.

FIG. 1 illustrates a block diagram of a position-measuring device 10 having a monitoring unit 200 according to an example embodiment of the present invention. Arranged on a graduation carrier 12 is an incremental graduation track 14, which is scanned by a scanning unit 16. Graduation carrier 12 is in the form of a scale or a circular disk, depending upon whether position-measuring device 10 is a device for measuring linear or rotary movements. In the first case, the scale is applied on a first machine part, for instance, and scanning unit 16 is mounted on a second machine part. In the second case, the circular disk is usually joined in rotatably fixed manner to a shaft, and scanning unit 16 is disposed fixed relative to it. In response to a movement of the first machine part relative to the second machine part in the direction of incremental graduation track 14, or in response to rotation of the shaft, position signals are obtained in scanning unit 16, which, when evaluated, provide information about relative position changes. Usually, a device is provided to determine a reference position (e.g., by overtraveling a reference mark). After determining the reference position, it is possible to determine the absolute position of scanning unit 16 relative to incremental graduation track 14, based on the reference position.

If the relative movement between incremental graduation track 14 and scanning unit 16 takes place with a constant speed, then preferably, the position signals are substantially sinusoidal and have a period duration which corresponds to the graduation period of incremental graduation track 14. There are position-measuring devices whose scanning units generate two position signals out-of-phase with each other by 90°. Likewise, there are position-measuring devices which process three position signals out-of-phase by 120°. However, it is considered advantageous to generate four position signals, in each case out-of-phase with each other by 90°, in the scanning unit, especially because high signal amplitudes and interference-immune signals are attained by differential processing of the two signal pairs out-of-phase by 180°. Such a system is illustrated in FIG. 1. In this exemplary embodiment, scanning unit 16 includes a detector unit 15 for scanning incremental graduation track 14. In so doing, detector unit 15 generates four scanning signals, in each case out-of-phase by 90°. They are amplified by amplifier units 17, and subsequently output as position signals P0, P90, P180 and P270. Position signals P0, P90, P180 and P270 are denoted as 0°-position signal P0, 90°-position signal P90, 180°-position signal P180 and 270°-position signal P270, corresponding to their phase relation.

The physical principle underlying the scanning is not important. Thus, for example, it may be an optical, magnetic, inductive or perhaps capacitive scanning.

Position signals P0, P90, P180, P270 are fed to a signal-processing unit 18, which from position signals P0, P90, P180, P270, generates counting signals with which the changes in the position signals, caused by the movement of the graduation carrier, i.e., of incremental graduation track 14 relative to scanning unit 16, are able to be counted as a function of the operational sign, that is, as a function of the moving direction. In this exemplary embodiment, signal-processing unit 18 includes only two comparators 19, to which two position signals P0, P180 and P90, P270, respectively, in each case out-of-phase by 180°, are supplied. Thus, two square-wave signals, out-of-phase by 90°, are obtained at the outputs of comparators 19 as counting signals for main counter unit 20, the square-wave signals allowing the signal periods of position signals P0, P90, P180, P270 to be counted as a function of the moving direction.

At this point, it should be pointed out that signal-processing unit 18 may have a substantially more complex configuration. In particular, it may include correction units for correcting offset errors, amplitude errors and phase errors of position signals P0, P90, P180, P270.

The counting signals are passed on to main counter unit 20. In this manner, at the output of main counter unit 20, an absolute position value is obtained whose basic resolution usually amounts to one graduation period of incremental graduation track 14.

During one graduation period, the two counting signals, out-of-phase by 90°, pass through four status combinations which may be assigned to the four quadrants (0°-90°; 90°-180°; 180°-270°; 270°-360° of a sinusoidal oscillation, and therefore may also be regarded as quadrant count values. Main counter unit 20 may co-output them as least significant bits (LSB), and thus, in an easy manner, increase the resolution to one quarter signal period.

The output of main counter unit 20 is fed to an interface unit 22 that is connected to sequential electronics 100, e.g., with the aid of a serial interface connection. Sequential electronics 100 may request position values (the counter reading of main counter unit 20), as well as possibly further data from position-measuring device 10 via this serial interface.

In addition to the formation of the counter value, which, with a resolution of whole signal periods or quarter signal periods, represents a relatively rough position value, a device may also be provided in position-measuring device 10 to produce a high-resolution, fine position value by interpolation of position signals P0, P90, P180, P270, and to supply it to interface unit 22, as well.

As already mentioned, in position-measuring devices 10 which are based on the evaluation of an incremental graduation track, devices are provided to produce a reference point for the count. In a simple case, this may be accomplished by providing on graduation carrier 12, in addition to incremental graduation track 14, a "reference mark" which likewise is able to be detected by scanning unit 16. After the reference mark has been detected, main counter unit 20 may be reset, i.e., set to a defined starting value. Devices of this kind are sufficiently familiar to one skilled in the art, and are not further explained here.

According to example embodiments of the present invention, the position signals in position-measuring device 10 are supplied further to a monitoring unit 200, which monitors the correctness of the position signals based on status combinations and their position-dependent sequence. A simple example for that is based on two, substantially sinusoidal position signals, which are out-of-phase with each other by 90°, and oscillate as a function of position around a reference value which lies at 50% of the peak-to-peak value of the position signals. If one assigns a logic high level to values above the reference value and a logic low level to values below the reference value, then four logic status combinations, which must imperatively follow each other during a movement of the scanning unit relative to the graduation carrier, are obtained for the two position values. On the other hand, if one of the status combinations is skipped, one may assume a malfunction of the scanning.

In monitoring device 200, position signals P0, P90, P180, P270 are fed to a signal logic unit 210 which forms status data words from position signals P0, P90, P180, P270 or position-signal groups. These status data words predictably change their status, that is, their digital value, during a relative movement between scanning unit 16 and incremental graduation track 14. If, upon comparison of these status data words in an evaluation unit 220, a discrepancy appears between the actual status and the anticipated status, then, if various position signals P0, P90, P180, P270 or position-signal groups are utilized to form the status data words, a failure of a position signal P0, P90, P180, P270 is able to be recognized.

Thus, for example, if in each case status data words are formed individually from the four position signals P0, P90, P180, P270 (as already described above, by signal comparison with a reference value that lies between the maximum value and minimum value of the position signal), then a faulty position signal is able to be ascertained by cross comparison of the status data words. In the same manner, it is possible to form status data words from pairs of position signals P0, P90, P180, P270, for instance, a first status data word by comparison of 0°-position signal P0 and 90°-position signal P90, as well as a second status data word by comparison of 180°-position signal P180 and 270°-position signal P270.

In example embodiments, such as that illustrated in FIG. 1, in order to form four status data words Z1, Z2, Z3, Z4, in each case three of the four position signals P0, P90, P180, P270 are utilized, which are supplied to status counting units 230, 240, 250, 260. Because position signals P0, P90, P180, P270 are periodic, three selected position signals always have one central position signal, one position signal lagging it by 90° and one position signal leading by 90°.

0°-position signal P0, 180°-position signal P180 and 270°-position signal P270 are supplied to a first status counting unit 230. In this case, 270°-position signal P270 is the central position signal, 180°-position signal P180 the lagging, and 0°-position signal P0 the leading. A first comparator 231 compares 0°-position signal P0 to 270°-position signal P270; a second comparator 232 compares 180°-position signal P180 to 270°-position signal P270. Thus, obtained at the outputs of comparators 231, 232, comparable to the outputs of comparators 19 of signal-processing unit 18, are two counting signals, out-of-phase with each other by 90°, which are supplied to a counter 233 for the counting—as a function of the operational sign or moving direction—of the signal periods of position signals P0, P180, P270 used.

Analogous to first status counting unit 230, in second status counting unit 240, a first comparator 241 compares (central) 0°-position signal P0 to (lagging) 270°-position signal P270, a second comparator 242 compares (central) 0°-position signal P0 to (leading) 90°-position signal P270, and a counter 243 counts the signal periods.

In third status counting unit 250, a first comparator 251 compares (central) 90°-position signal P90 to (leading) 180°-position signal P180, a second comparator 252 compares (central) 90°-position signal P90 to (lagging) 0°-position signal P0, and a counter 253 counts the signal periods.

Finally, in fourth status counting unit 260, a first comparator 261 compares (lagging) 90°-position signal P90 to (central) 180°-position signal P180, a second comparator 262 compares (leading) 270°-position signal P270 to (central) 180°-position signal P180, and a counter 263 is provided to count the signal periods.

In summary, in each status counting unit 230, 240, 250, 260, exactly one of position signals P0, P90, P180, P270 remains unconsidered. The result of the omission of one position signal is thus that three counters deviate from the anticipated values (e.g., stop), while the counter which does not consider this one position signal continues to deliver the anticipated values.

The introduction of counters 233, 243, 253, 263 has the special advantage that not only instantaneous status changes, thus position changes within one graduation period, but also the position-dependent progression of the status changes is ascertained. Particularly in the case of very fast status changes as the result of a high traversing speed of scanning unit 16 with respect to incremental graduation track 14, in order to ascertain an invalid status in evaluation unit 220, a tolerance range may be defined, within which the counter values of status counting units 230, 240, 250, 260 are allowed to deviate from each other.

Each status counting unit 230, 240, 250, 260 in FIG. 1 includes two comparators 231, 232, 241, 242, 251, 252, 261, 262. However, since comparators 231 and 241, 232 and 262, 242 and 252, 251 and 261 in each case process identical position signals, the number of comparators in signal logic unit 210 may be halved if the outputs of the remaining comparators are in each instance supplied to two counters. Thus, for example, it is possible to dispense with comparator 241 if the output of comparator 231 is supplied not only to first counter 233 in first status counting unit 230, but also to second counter 243 in second status counting unit 240. In this case, comparator 231 may be assigned both to first status counting unit 230 and to second status counting unit 240.

The outputs of counters 233, 243, 253, 263 form status data words Z1, Z2, Z3, Z4. In this context, the bit number of status data words Z1, Z2, Z3, Z4 may correspond to the bit number of main counter unit 20, and thus encompass the entire measuring range of the position-measuring device. This has the special advantage that in this case, in addition to the counter value of main counter unit 20, redundant counter values are available and may possibly be co-output via interface unit 22. It is usually sufficient to provide merely a few, e.g., three bits, and to form the counter as a "revolving" counter which, after reaching the highest counter reading, begins again at zero, or upon dropping below the lowest counter reading, jumps to the maximum value. The smallest possible status data word Z1, Z2, Z3, Z4 includes just 1 bit. The counter value may be supplemented by the digital output signals of comparators 231, 232, since, as already described above, they are quadrant count values. In a simplified arrangement, it is possible to dispense with counters 233, 243, 253, 263, and to pass on merely the quadrant count values as status data words Z1, Z2, Z3, Z4 to evaluation unit 220.

Evaluation unit 220 compares status data words Z1, Z2, Z3, Z4 and generates an error signal F if an invalid status occurs. For example, error signal F may be supplied to interface unit 22, and relayed from it to sequential electronics 100. An invalid status may be recognized, first of all, by comparing status data words Z1, Z2, Z3, Z4 to each other (divergence of the counter values beyond the allowed tolerance), and secondly, by checking value changes of status data words Z1, Z2, Z3, Z4 for plausibility (counter values are in each case only allowed to change by one counting step).

Further advantages may be achieved if the counter value of main counter unit 20, which really forms the actual measured position value, is supplied completely or partially (e.g., a number of the lower-order bits) to evaluation unit 220, and is likewise compared to status data words Z1, Z2, Z3, Z4. In this manner, not only are position signals P0, P90, P180, P270 monitored, but also the signal path of position signals P0, P90, P180, P270 via signal-processing unit 18 and main counter unit 20, by the cross comparison with the counter value of main counter unit 20.

Figure 2:
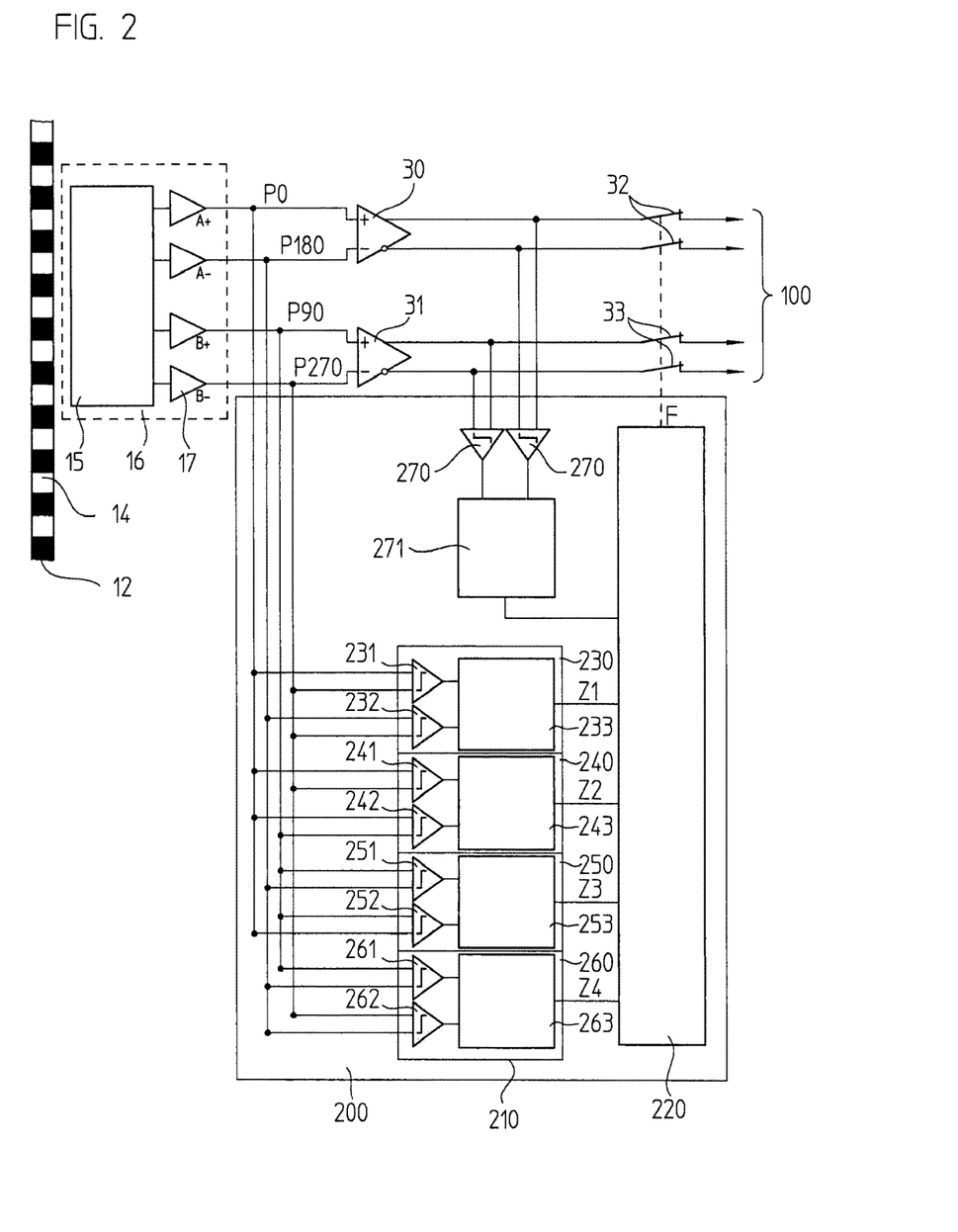
FIG. 2 illustrates a block diagram of a position-measuring device having a monitoring unit according to an example embodiment of the present invention.

FIG. 2 illustrates a block diagram of a position-measuring device having a monitoring unit 200 according to another example embodiment. Different from the previously-described exemplary embodiment, this position-measuring device generates no digital position value in the form of a counter value as output signal, but rather outputs analog position signals P0, P90, P180, P270, amplified by differential amplifiers 30, 31, to sequential electronics 100 for further processing.

To nevertheless permit a cross comparison between the signal path for generating status data words Z1, Z2, Z3, Z4, and the output signals of differential amplifiers 30, 31, monitoring unit 200 additionally includes—analogous to comparators 19 and main counter unit 20 from the exemplary embodiment illustrated in FIG. 1—two comparators 270 and an auxiliary counter unit 271 for generating a digital counter value. Since there is no necessity here to cover the entire measuring range of the position-measuring device, auxiliary counter unit 271 may be limited to a few bits. Here, as well, it is possible to utilize the output signals of comparators 270 as quadrant count values for the comparison to status data words Z1, Z2, Z3, Z4 in evaluation unit 220.

Differential amplifiers 30, 31 again represent merely a greatly simplified variant of the signal processing. Instead of differential amplifiers 30, 31, a substantially more complex circuit may be provided which, besides the pure amplification function, also carries out a further processing of position signals P0, P90, P180, P270, for example, the correction of offset errors and/or phase errors or a synthetic frequency multiplication of the output signals compared to position signals P0, P90, P180, P270.

Alternatively, instead of analog output signals, differential amplifiers 30, 31 may also form quadrant count values and output them directly as "quadrature signals" to sequential electronics 100 for further evaluation.

Since in this exemplary embodiment, no interface unit is provided for transmitting digital information, error signal F may be output via a separate line to sequential electronics 100. If a separate line is not desired, an error may also be signaled indirectly via the output signal lines. Thus, in the exemplary embodiment illustrated in FIG. 2, the output signals of differential amplifiers 30, 31 are routed across circuit elements 32, 33. The appearance of error signal F now leads to the opening of circuit elements 32, 33, and thus signals the error case to sequential electronics 100. Alternatively, a short-circuit could also be brought about between the output signals of differential amplifiers 30, 31 in order to signal the error case.

Figure 3:
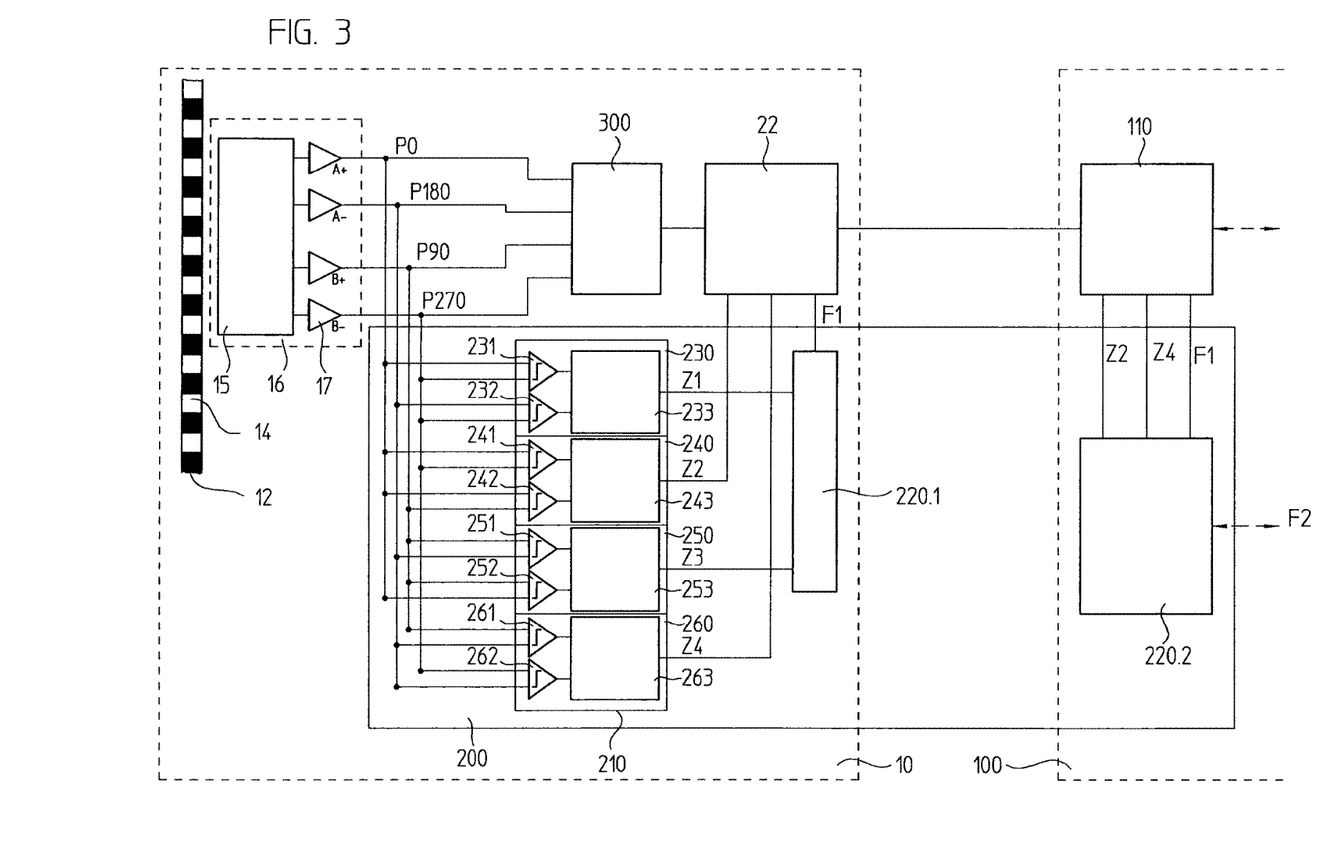
FIG. 3 illustrates a block diagram of a position-measuring device having a monitoring unit according to an example embodiment of the present invention.

A block diagram of a monitoring unit 200 according to another example embodiment is shown in FIG. 3. Components which were already described in conjunction with the previously-described exemplary embodiments bear the same reference numerals as in FIGS. 1 and 2.

The major difference here in comparison to the preceding exemplary embodiments is that, in this example, evaluation unit 220 is split into a first evaluation unit 220.1 and a second evaluation unit 220.2, first evaluation unit 220.1 being located in position-measuring device 10, and second evaluation unit 220.2 being in sequential electronics 100. Consequently, monitoring unit 200 in this exemplary embodiment covers position-measuring device 10 and sequential electronics 100.

First status data word Z1 and third status data word Z3 are supplied to first evaluation unit 220.1. As already indicated above, 0°-position signal P0, 180°-position signal P180 and 270°-position signal P270 are utilized to generate first status data word Z1, but not the 90°-position signal. On the other hand, to generate third status data word Z3, 270°-position signal P270 remains unused, and instead, 90°-position signal P90 is used. If the two status data words Z1 and Z3 deviate from each other, then a failure of one of the two position signals P90 or P270 may be inferred. In this case, first evaluation unit 220.1 outputs a first error signal F1 to interface unit 22.

Second status data word Z2 and fourth status data word Z4 are evaluated in second evaluation unit 220.2. To that end, they are supplied to interface unit 22, and from it, are transmittable to an interface unit 110 in sequential electronics 100, which passes them on to second evaluation unit 220.2 for evaluation. Because the 180°-position signal is not used to generate second status data word Z2 and 0°-position signal P0 is not used to generate fourth status data word Z4, again owing to a deviation of the two status data words Z2, Z4, an error of one of the two position signals P0, P180 may be inferred, which is signaled by a second error signal F2.

Analogous to error signal F in the first exemplary embodiment, first error signal F1 is supplied to interface unit 22, and is transmittable to sequential electronics 100. There, it may either be evaluated separately, or, as indicated in FIG. 3, be supplied to second evaluation unit 220.2, which includes it with the others for forming second error signal F2, so that second error signal F2 forms a composite error signal that generally signals a failure or error of one of position signals P0, P90, P180, P270.

The splitting of evaluation unit 220 into a first evaluation unit 220.1 in position-measuring device 10 and a second evaluation unit 220.2 in sequential electronics 100, illustrated in FIG. 3, is considered particularly advantageous, especially when, in order to generate status data words Z2, Z4 which are transmitted to sequential electronics 100, status counting units 240, 260 are used, whose counting range encompasses the measuring range of position-measuring device 10, thus, the graduation marks to be counted on the graduation carrier, possibly amplified by the quadrant counting values. In this case, it is possible to dispense with a main counter unit 20, since status data words Z2, Z4 already represent complete position values. Moreover, due to the redundant transmission of the two status data words Z2, Z4 and their evaluation in sequential electronics 100, errors are able to be discovered in the data transmission via the data-transmission path, which is formed by interface unit 22 in position-measuring device 10, interface unit 110 in sequential electronics 100, as well as the data-transmission line located in between.

On the other hand, it is sufficient if status counting units 230, 250 having a small counting range, e.g., 8 bits or less, are provided for generating status data words Z1 and Z3, which are evaluated in position-measuring device 10.

Furthermore, position-measuring device 10 in FIG. 3 includes an interpolator 300, which, from the amplitude values of position signals P0, P90, P180, P270, generates a fine position value that indicates the position between two graduation marks on graduation carrier 12. As one skilled in the art knows, this may be accomplished by analog-to-digital conversion and subsequent use of mathematical algorithms (e.g., CORDIC). The resolution of position-measuring device 10 may be increased substantially through amplification of the position values (status data words Z2, Z4) by the fine position value. To improve the probability of discovering errors, it is considered advantageous to amplify status data words Z2, Z4 by the fine position value in position-measuring device 10, and to include it with the others in the evaluation in second evaluation unit 220.2.

It should be understood that the exemplary embodiments described herein merely show variants of monitoring units. The measures described herein may also be employed, suitably modified, in other position-measuring devices. The monitoring units described herein are especially well-suited to be integrated in application-specific integrated circuits (ASICs). Scanning unit, position evaluation, interface unit, as well as the monitoring unit as described herein are advantageously integrated in one single ASIC.

If a part of evaluation unit 220 is disposed in sequential electronics 100, as shown in the third exemplary embodiment by second evaluation unit 220.2, then, for instance, this part may be implemented as an ASIC or FPGA (Field Programmable Gate Array). However, since, as a rule, sequential electronics 100 are in the form of a computer, second evaluation unit 220.2 may also be provided as a computer program.

What is claimed is:

1. A system, comprising:
an incremental graduation track;
a monitoring unit adapted to monitor position signals;
a scanning unit connected to the monitoring unit and adapted to scan the incremental graduation track, the scanning unit adapted to generate at least two position signals by scanning the incremental graduation track, the at least two position signals being out-of-phase with each other, the scanning unit adapted to output the at least two out-of-phase position signals to an input of the monitoring unit;
wherein the monitoring unit includes:
a signal logic unit adapted to generate at least two position-dependent status data words from different combinations of the out-of-phase position signals, the signal logic unit including at least two status counters adapted to count status changes of respective combinations of the out-of-phase position signals and adapted to generate counter values as the status data words; and
an evaluation unit, the status counters adapted to supply the counter values as the status data words to the evaluation unit, the evaluation unit adapted to ascertain invalid statuses by comparing the counter values as the status data words and to generate an error signal in response to an ascertained invalid status.

2. The monitoring unit according to claim 1, wherein the position signals include a 0°-position signal, a 90°-position signal, a 180°-position signal, and a 270°-position signal having a phase shift of 90° relative to each other, each status counters suppliable with three position signals and including two comparators adapted to generate quadrant count values, out-of-phase with each other by 90°, from two of the three position signals that are out-of-phase with each other by 90°.

3. The monitoring unit according to claim 2, wherein the signal logic unit is adapted to supply the quadrant count values as status data words to the evaluation unit.

4. The monitoring unit according to claim 2, wherein each status counter includes a counter to which the quadrant count values are suppliable and which is adapted to count signal periods of the position signals, and the signal logic unit is adapted to supply the counter values of the counters as status data words to the evaluation unit.

5. The monitoring unit according to claim 1, wherein the position-measuring device is adapted to supply output signals to the monitoring unit, the evaluation unit adapted to take into account the output signals of the position-measuring device in the comparison.

6. The monitoring unit according to claim 1, wherein the signal logic unit is adapted to generate four status data words, the evaluation unit including a first evaluation unit and a second evaluation unit, the first evaluation unit arranged in the position-measuring device and the second evaluation unit arranged in sequential electronics, two of the four status words suppliable to the first evaluation unit and to the second evaluation unit, respectively, the first evaluation unit adapted to generate a first error signal in response to an ascertained invalid status, and the second evaluation unit adapted to generate a second error signal in response to an ascertained invalid status.

7. The monitoring unit according to claim 6, wherein the position-measuring device includes an interface unit and the sequential electronics includes an interface unit, the interface units adapted to supply to the second evaluation unit the two status data words, which are compared in the second evaluation unit.

8. The monitoring unit according to claim 6, wherein the status data words suppliable to the second evaluation unit include counter values whose counting range encompasses a measuring range of the position-measuring device.

9. The monitoring unit according to claim 1, wherein the position signals are incremental position signals.

10. A method for monitoring position signals of incremental position-measuring devices comprising:
   scanning an incremental graduation track by a scanning unit to generate at least two position signals that are out-of-phase with each other;
   supplying the out-of-phase position signals to an input of a monitoring unit;
   generating at least two position-dependent status data words from different combinations of the out-of-phase position signals in a signal logic unit, including counting, by status counters, status changes of respective combinations of the out-of-phase position signal and outputting, to an evaluation unit, counter values a the status data words;
   ascertaining invalid statuses of the status data words by comparison in the evaluation unit; and
   generating an error signal in response to an ascertained invalid status in the evaluation unit.

11. The method according to claim 10, wherein the position signals include a 0°-position signal, a 90°-position signal, a 180°-position signal, and a 270°-position signal which have a phase shift of 90° relative to each other, three position signals being supplied to each status counter, each status counter including two comparators, which generate, from two of the three position signals that are out-of-phase with each other by 90°, quadrant count values out-of-phase with each other by 90°.

12. The method according to claim 11, wherein the comparators supply the quadrant count values as status data words to the evaluation unit.

13. The method according to claim 11, wherein each status counter includes a counter to which the quadrant count values are supplied and which counts signal periods of the position signals, and supplies the counter values of the counters as status data words to the evaluation unit.

14. The method according to claim 10, wherein output signals of the position-measuring device are supplied to the monitoring unit, and the evaluation unit takes into account the output signals in the comparison.

15. The method according to claim 10, wherein four status data words are generated in the signal logic unit, the evaluation unit including a first evaluation unit and a second evaluation unit, the first evaluation unit arranged in the position-measuring device and the second evaluation unit arranged in sequential electronics, two of the four status data words are supplied to the first evaluation unit and to the second evaluation unit, respectively, and a first error signal is generated in the first evaluation unit in response to an ascertained invalid status, and a second error signal is generated in the second evaluation unit in response to an ascertained invalid status.

16. The method according to claim 15, wherein the two status data words, which are compared in the second evaluation unit, are supplied to the second evaluation unit via an interface unit of the position-measuring device and an interface unit of the sequential electronics.

17. The method according to claim 15, wherein the status data words, which are supplied to the second evaluation unit, include counter values whose counting range encompasses a measuring range of the position-measuring device.

18. The method according to claim 10, wherein the position signals are incremental position signals.

* * * * *